US007068915B1

(12) United States Patent
Cho

(10) Patent No.: US 7,068,915 B1
(45) Date of Patent: Jun. 27, 2006

(54) METHOD AND APPARATUS FOR CONTROLLING DISPLAY TIME POINT OF MPEG BIT STREAM OF RECORDING MEDIUM

(75) Inventor: Sang Hee Cho, Seoul (KR)

(73) Assignee: LC Electronics Inc., Seoul (KR)

( * ) Notice: Subject to any disclaimer, the term of this patent is extended or adjusted under 35 U.S.C. 154(b) by 1121 days.

(21) Appl. No.: 09/710,959

(22) Filed: Nov. 14, 2000

(30) Foreign Application Priority Data

Nov. 15, 1999 (KR) ............................... 1999-50559

(51) Int. Cl.
*H04N 5/91* (2006.01)

(52) U.S. Cl. .......................................... 386/68; 386/46
(58) Field of Classification Search ................ 386/6–8, 386/33, 40, 45, 65, 66, 68, 85–90, 124–125, 386/46
See application file for complete search history.

(56) References Cited

U.S. PATENT DOCUMENTS

| 5,596,420 A | * | 1/1997 | Daum ........................ 386/110 |
| 5,793,927 A | * | 8/1998 | Lane .......................... 386/81 |
| 6,018,376 A | * | 1/2000 | Nakatani ..................... 386/65 |
| 6,408,338 B1 | * | 6/2002 | Moon et al. .................. 386/68 |

OTHER PUBLICATIONS

Watkinson, John; "MPEG-2"; 1999; Focal Press, pp. 224 and 227.*

* cited by examiner

Primary Examiner—James J. Groody
Assistant Examiner—James A. Fletcher
(74) Attorney, Agent, or Firm—Fleshner & Kim LLP

(57) ABSTRACT

An apparatus and method for controlling a display time point of an MPEG bit stream of a recording medium which is capable of controlling accurately a display time point of an MPEG bit stream in case that an MPEG bit stream of a recording medium is processed to be displayed according to a special decoding command and returns to a normal decoding command. The apparatus for controlling a display time point of an MPEG bit stream of a recording medium includes: a crystal oscillator for generating a system clock frequency; a counter being initialized according to a system clock reference (SCR), for receiving the system clock frequency from the crystal oscillator, counting it and outputting a system time clock (STC), in a normal decoding mode; a PTS (Presentation Time Stamps) controller for receiving and storing a presentation time stamp of a predetermined picture in a special decoding mode, and outputting the stored presentation time stamp as an initial value of the counter if it returns to a normal mode; and a comparator for receiving the system time clock (STC) from the counter and a presentation time stamp (PTS) of a predetermined picture, comparing them and outputting a display command signal in case that the system time clock (STC) and the presentation time stamp (PTS) of a predetermined picture are identical to each other upon comparison.

15 Claims, 3 Drawing Sheets

METHOD AND APPARATUS FOR CONTROLLING DISPLAY TIME POINT OF MPEG BIT STREAM OF RECORDING MEDIUM

BACKGROUND OF THE INVENTION

1. Field of the Invention

The present invention relates to a technique for controlling a display time point of an MPEG bit stream, and more particularly to an apparatus and method for controlling a display time point of an MPEG bit stream of a recording medium which is capable of controlling accurately a display time point of an MPEG bit stream in case that an MPEG bit stream of a recording medium is processed to be displayed according to a special decoding command and returns to a normal decoding command.

2. Description of the Background Art

FIG. 1 is a schematic block diagram of an apparatus for controlling a display time point of an MPEG bit stream of a broadcasting medium in accordance with a conventional art.

As shown in the drawing, the apparatus for controlling a display time point of an MPEG bit stream of a broadcasting medium of the conventional art includes a counter 40 being initialized according to a system time reference (SCR), for receiving a system clock frequency (27 MHz), counting it and outputting a system time clock (STC); a subtractor 10 for receiving the system time clock (STC) and the system time reference (SCR) from the counter 40, subtracting them and outputting a difference signal (e); a low-pass filter and amplifier 20 for receiving the difference signal (e) from the subtractor 10, low-pass filtering it and amplifying it; a voltage control oscillator 30 for receiving the output signal from the low-pass filter and amplifier 20, controlling a voltage of the output signal, and outputting a system clock frequency (27 MHz); and a comparator 50 for receiving presentation time stamps (PTS) of a predetermined broadcasting picture and the system time clock (STC) outputted from the counter 40, comparing them, and outputting a display command signal in case that a time point of the system time clock (STC) and a time point of the presentation time stamps (PTS) are identical to each other upon comparison.

The operation of the apparatus for controlling display time pint of an MPEG bit stream of a broadcasting medium of the conventional art constructed as described above will now be explained with reference to the accompanying drawings.

To begin with, after the counter 40 is initialized according to a system clock reference (SCR), it receives a system clock frequency (27 MHz) from the voltage control oscillator 30, counts it and outputs a system time clock (STC).

That is, when bit streams are inputted at a constant rate, the counter 40 initializes the decoder clock on the basis of the system clock reference (SCR) inputted from an encoder (not shown).

At this time, the subtractor 10 receives the system time clock (STC) and the system clock reference (SCR) from the counter 40, obtains a difference signal (e) between the two signals, and transmits it to the low-pass filter and amplifier 20.

Upon receipt of the difference signal (e) from the subtractor 10, the low-pass filter and amplifier 20 low-pass filters it, amplifies it to a predetermined level and then outputs it.

Thereafter, the voltage control generator 30 receives the output signal (f) of the low-pass filter and amplifier 20, controls its voltage and outputs a system clock frequency (27 MHz).

Meanwhile, the comparator 50 receives the system time clock (STC) from the counter 40 and the presentation time stamps of a broadcast picture and compares them. Upon comparison, if the time point of the system time clock (STC) and the time point of presentation time stamps (PTS) are identical to each other, the comparator 50 outputs a display command signal, according to which a predetermined broadcast picture is displayed on a screen.

Namely, the apparatus for controlling a display time point of an MPDG bit stream of a broadcasting medium in accordance with the conventional art is based on the assumption that the MPEG bit streams are inputted at a constant rate, so that the system time clock can be computed on the basis of the system clock reference that is periodically inputted to the apparatus.

However, as for the apparatus for controlling a display time point of MPEG bit streams of a recording medium, the MPEG bit streams are not inputted at a constant rate. Thus, the system clock reference can not be used to obtain a system time clock of the decoder.

In addition, in case of decoding the recorded MPEG bit streams, it is not necessary to recover a decoder clock in synchronization with a clock of the encoder as shown in FIG. 2. However, the MPEG bit streams should be displayed by using the system clock reference and the presentation time stamps at a predetermined time. In this case, there is a problem that, in the course of performing special decoding, such as a pause, a fast winding or slow motion, if it returns to perform a normal decoding, the system time clock and the presentation time stamps are asynchronized.

SUMMARY OF THE INVENTION

Therefore, an object of the present invention is to provide an apparatus for controlling a display time point of an MPEG bit stream of a recording medium by which, while an MPEG bit stream is being read from a recording medium to perform a special decoding, if it returns to a normal decoding, a system time clock of a decoder is controlled to be synchronized with presentation time stamps, to thereby accurately display a picture without an error, and its method.

To achieve these and other advantages and in accordance with the purpose of the present invention, as embodied and broadly described herein, there is provided an apparatus for controlling a display time point of an MPEG bit stream of a recording medium including: a crystal oscillator for generating a system clock frequency; a counter being initialized according to a system clock reference (SCR), for receiving the system clock frequency from the crystal oscillator, counting it and outputting a system time clock (STC); a PTS (Presentation Time Stamps) controller for receiving and storing a presentation time stamp of a predetermined picture in a special decoding mode, and outputting the stored presentation time stamp as an initial value of the counter if it returns to a normal mode; and a comparator for receiving the system time clock (STC) from the counter and a presentation time stamp (PTS) of a predetermined picture, comparing them and outputting a display command signal in case that the system time clock (STC) and the presentation time stamp (PTS) of a predetermined picture are identical to each other upon comparison.

To achieve the above objects, there is also provided a method for controlling a display time point of an MPEG bit stream of a recording medium including the steps of: initializing a counter according to a system clock reference, and judging that the current mode is a normal decoding mode, when a presentation time stamp is inputted; comparing a system time clock with the presentation time stamp while increasing the system time clock in case that the current mode is a normal decoding mode upon judgement, and outputting a display command signal at the time point when the system time clock and the presentation time stamp are identical to each other; storing a presentation time stamp of the currently inputted picture in case that the current mode is a special decoding mode, and updating the stored presentation time stamp with the presentation time stamp of a decoded or a skipped picture, while performing the special decoding command; and replacing the system time clock with the previously stored presentation time stamp to perform a normal decoding, in case that it is switched to a normal decoding mode after the special decoding is performed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
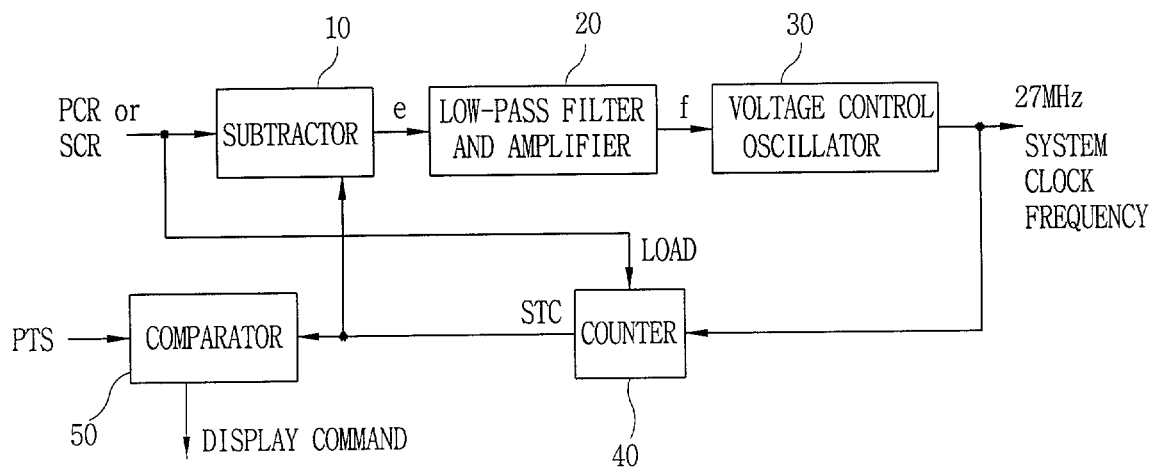
FIG. 1 is a schematic block diagram of an apparatus for controlling a display time point of an MPEG bit stream of a broadcasting medium in accordance with a conventional art.
Figure 2:
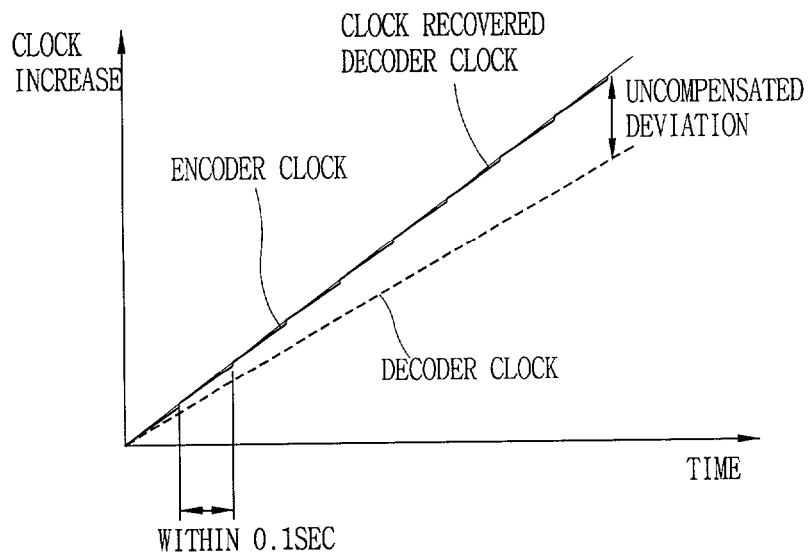
FIG. 2 shows a system time clock control wave form of the apparatus for controlling a display time point of an MPEG bit stream of a broadcasting medium in accordance with a conventional art.
Figure 3:
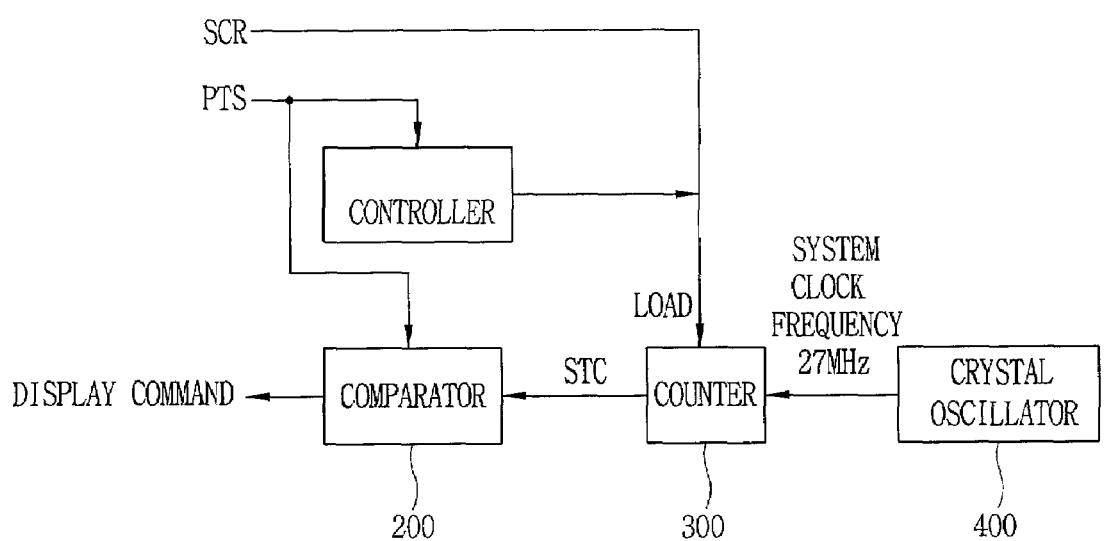
FIG. 3 is a schematic block diagram of an apparatus for controlling a display time point of an MPEG bit stream of a recording medium in accordance with the present invention.

FIG. 3 is a schematic block diagram of an apparatus for controlling a display time point of an MPEG bit stream of a recording medium in accordance with the present invention.

As shown in the drawing, the an apparatus for controlling a display time point of an MPEG bit stream of a recording medium of the present invention includes a PTS controller 100, a comparator 200, a counter 300 and a crystal oscillator 400.

The operation of the apparatus for controlling a display time point of an MPEG bit stream of a recording medium constructed as described above will now be explained with reference to the accompanying drawings.

First, in a normal decoding mode, the counter 300 is initialized according to the system clock reference (SCR), counts the system clock frequency (27 MHz) outputted from the crystal oscillator 400, and applies the system time clock (STC) to the comparator 200.

Upon receipt of the system time clock (STC) from the counter 300 and a presentation time stamp (PTS) of a predetermined picture, the comparator 200 compares them, and if the presentation time stamp (PTS) of a predetermined picture and the system time clock (STC) are identical to each other upon comparison, the comparator 200 outputs a display command signal.

Then, a picture including the presentation time stamp (PTS) is displayed on a screen according to the display command signal.

Meanwhile, in case that it is switched to a special decoding mode (i.e., fast winding, pause, slow motion, etc), the PTS controller 100 stores the presentation time stamp that is currently being inputted, and updates the initially stored presentation time stamp (PTS) with the presentation time stamp (PTS) of a picture processed as the special decoding until it returns to the normal mode.

After the special decoding is processed, in case that it is switched to the normal decoding mode, the PTS controller 100 applies the updated presentation time stamp (PTS) to the counter 300. Then, the counter is initialized by the updated presentation time stamp. That is, the counter 300 receives the presentation time stamp (PTS) from the PTS controller 100 and the system clock frequency (27 MHz) from the crystal oscillator 400, counts it and applies the system time clock (STC) to the comparator 200.

Upon receipt of the system time clock (STC) from the counter 300, the comparator 200 compares the system time clock (STC) with the presentation time stamp (PTS) of a predetermined picture that is being currently inputted. Upon comparison, if the system time clock (STC) and the presentation time stamp (PTS) of the predetermined picture are identical to each other, the comparator 200 outputs a display command.

When it is in the special decoding mode, in case of a pause, the time point instructed by a user becomes the display time point, and in case of a fast winding, when a 'P' frame or an 'I' frame is detected during analyzing the MPEG bit stream, a time point at which decoding of the 'P' frame or the 'I' frame is ended becomes the display time point.

Meanwhile, in case of a picture that does not have a presentation time stamp (PTS), the number of frames which performed the special decoding is added to the presentation time stamp (PTS) of the previous picture, thereby obtaining a presentation time stamp (PTS).

Figure 4:
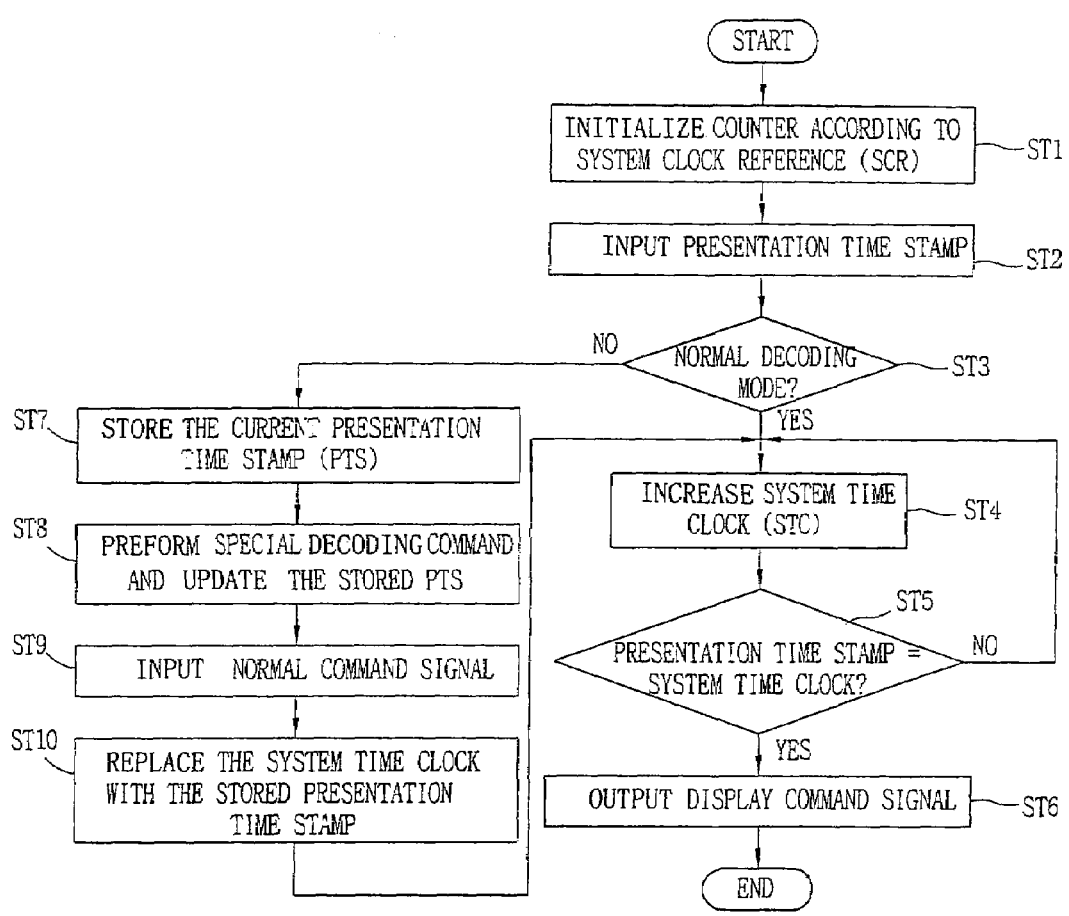
FIG. 4 is a flow chart of a method for controlling a display time point of an MPEG bit stream of a recording medium in accordance with the present invention.

FIG. 4 is a flow chart of a method for controlling a display time point of an MPEG bit stream of a recording medium in accordance with the present invention.

With reference to FIG. 4, the method for controlling a display time point of an MPEG bit stream of a recording medium of the present invention will now be described.

First, the counter is initialized according to the system clock reference (SCR) (ST1).

And, when a presentation time stamp (PTS) of a predetermined picture is inputted (ST2), it is judged whether the current mode is a normal decoding mode (ST3).

Upon judgement, in case that the current mode is a normal decoding mode, a comparing operation is repeatedly performed to compare the system time clock with the presentation time stamp (PTS) while increasing the system time clock until the system time clock is identical to the presentation time stamp of the predetermined picture (ST4) (ST5).

When the system time clock (STC) and the presentation time stamp (PTS) of the predetermined picture (STC) are identical to each other, a display command signal is inputted at the time point (ST6).

Meanwhile, upon judgement, in case that the current mode is a special decoding mode, the presentation time stamp (PTS) of the currently inputted picture is stored (ST7). And then, while performing the special decoding command, the stored presentation time stamp (PTS) is updated with a presentation time stamp (PTS) of a decoded or skipped picture (ST8).

Thereafter, after the special decoding mode is performed, when it is switched to a normal decoding mode (ST9), the system time clock (STC) is replaced with the previously stored presentation time stamp (PTS), to thereby performing a normal decoding operation (ST10).

As so far described, according to the apparatus and method for controlling a display time point of an MPEG bit stream of a recording medium of the present invention, after the presentation time stamp (PTS) of a picture inputted at the time point of the special decoding command is stored, the stored presentation time stamp (PTS) is updated with the presentation time stamp (PTS) of a decoded or a skipped picture while performing the special decoding command, and then, when it is switched to the normal decoding mode, the system time clock (STC) is replaced with the previously stored presentation time stamp (PTS), to thereby perform the normal decoding operation. Thus, in this manner, the MPEG bit stream can be accurately displayed without an error.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. An apparatus for controlling a display time point of an MPEG bit stream of a recording medium, comprising:
    a crystal oscillator configured to generate a system clock frequency;
    a counter initialized according to a system clock reference (SCR) and configured to receive the system clock frequency from the crystal oscillator, count it, and output a system time clock (STC), in a normal decoding mode;
    a PTS (Presentation Time Stamp) controller configured to receive and store a presentation time stamp of a predetermined picture in a special decoding mode, and output the stored presentation time stamp as an initial value of the counter when the apparatus returns to a normal mode; and
    a comparator configured to receive the system time clock from the counter and a presentation time stamp of a predetermined picture, compare them, and output a display command signal in the case that the system time clock and the presentation time stamp of a predetermined picture are identical to each other upon comparison.

2. The apparatus according to claim 1, wherein the special decoding mode includes a pause mode and a fast winding mode.

3. The apparatus according to claim 1, wherein the special decoding mode includes a slow motion mode in which, after a predetermined picture is decoded, the predetermined picture is repeatedly displayed to thereby slow the decoding operation.

4. The apparatus according to claim 2, wherein, in the case of the pause mode, the time point at which a user inputs a pause command is a display time point of a screen.

5. The apparatus according to claim 2, wherein, in the case of a fast winding, when a 'P' frame or an 'I' frame is detected during analyzing the MPEG bit stream, a time point at which decoding of the 'P' frame or the 'I' frame is ended becomes the display time point.

6. The apparatus according to claim 1, wherein the comparator outputs a display command signal when the system time clock and the presentation time stamp of the predetermined picture are identical to each other.

7. The apparatus according to claim 1, wherein, in the case that the system time clock and the presentation time stamp of the predetermined picture are not identical to each other, the comparator repeatedly performs the comparing operation to compare the system time clock and the presentation time stamp of the predetermined picture while increasing the system time clock, until they are identical to each other.

8. The apparatus according to claim 1, wherein, in the special decoding mode, the PTS controller stores the presentation time stamp of a picture being currently input, and then updates the stored presentation time stamp with a presentation time stamp of a decoded or a skipped picture while performing the decoding command.

9. The apparatus according to claim 1, wherein, upon receipt of the presentation time stamp from the PTS controller, the counter sets the presentation time stamp as an initial value, and receives the system clock frequency from the crystal oscillator, counts it, and outputs the system time clock.

10. A method for controlling a display time point of an MPEG bit stream of a recording medium, comprising:
    initializing a counter according to a system clock reference, and judging whether the current mode is a normal decoding mode, when a presentation time stamp of a predetermined picture is input;
    comparing a system time clock with the presentation time stamp of the predetermined picture;
    increasing the system time clock, in the case that the current mode is a normal decoding mode,
    storing a presentation time stamp of a currently input picture in the case that the current mode is a special decoding mode;
    updating the stored presentation time stamp with a presentation time stamp of a decoded or a skipped picture, while performing the special decoding; and
    replacing the system time clock based on the updated presentation time stamp to perform a normal decoding, in the case that the current mode is switched to a normal decoding mode after the special decoding has been performed.

11. The method according to claim 10, wherein the comparing step comprises outputting a display command signal when the system time clock and the presentation time stamp are identical to each other.

12. The method according to claim 10, wherein, in the comparing step, in the case that the system time clock and the presentation time stamp are not identical to each other, the system time clock is repeatedly increased.

13. The method according to claim 10, wherein, in the normal decoding operation, the stored presentation time stamp is updated with a presentation time stamp of a decoded or a skipped picture.

14. The method according to claim 10, wherein the normal decoding operation comprises obtaining a presentation time stamp by adding the number of frames for which the special decoding was performed to the presentation time stamp of the previous picture, in the case that the currently input picture does not have a presentation time stamp.

15. The apparatus according to claim 9, wherein the system clock frequency is 27 MHz.

* * * * *